(12) United States Patent
Takeuchi et al.

(10) Patent No.: US 7,106,525 B2
(45) Date of Patent: Sep. 12, 2006

(54) OBJECTIVE LENS FOR OPTICAL PICK-UP

(75) Inventors: Shuichi Takeuchi, Saitama-ken (JP); Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/752,707

(22) Filed: Jan. 8, 2004

(65) Prior Publication Data
US 2004/0136096 A1    Jul. 15, 2004

(30) Foreign Application Priority Data
Jan. 9, 2003    (JP)    ............... 2003-003535

(51) Int. Cl.
- G02B 13/18    (2006.01)
- G02B 3/02    (2006.01)
- G11B 7/00    (2006.01)
- G11B 7/135    (2006.01)

(52) U.S. Cl. .................. 359/719; 369/112.06
(58) Field of Classification Search ........ 359/719, 359/741–743, 3, 19; 369/112.06, 112.07, 369/112.23, 44.23, 112.03
See application file for complete search history.

(56) References Cited
U.S. PATENT DOCUMENTS
6,088,322 A    7/2000  Broome et al.
6,191,889 B1   2/2001  Maruyama
6,473,387 B1   10/2002 Maruyama et al.
6,624,942 B1   9/2003  Maruyama
2002/0172132 A1  11/2002  Takeuchi et al.
2003/0058776 A1  3/2003   Sakamoto FOREIGN PATENT DOCUMENTS
EP    1102251       5/2001
JP    200 1-338431  12/2001
JP    200 2-372665  12/2002

*Primary Examiner*—Alicia M Harrington
(74) *Attorney, Agent, or Firm*—Greenblum & Bernstein, P.L.C.

(57) ABSTRACT

There is provided an objective lens for an optical pick-up used for different types of optical discs. The objective lens has at least one surface on which a plurality of annular zones are formed. The at least one surface is divided into an inner area having a low NA and an outer area having high NA outside the inner area. Further, with regard to a light beam used for a second optical disc (e.g., a DVD), an optical path difference generated between at least one of steps formed between adjacent annular zones of the plurality of annular zones within the outer area is lower by a predetermined amount than an integral multiple of a wavelength of the light beam used for the second optical disc.

10 Claims, 4 Drawing Sheets

OBJECTIVE LENS FOR OPTICAL PICK-UP

BACKGROUND OF THE INVENTION

The present invention relates to an objective lens for an optical pick-up of an optical disc drive, which is capable of recording/reproducing data to/from a plurality of kinds of optical discs whose cover layers have different thicknesses.

In general, an optical pick-up for an optical disc drive is provided with a laser source such as a laser diode, an objective lens which converges the laser beam emitted by the laser source on a data recording layer of the optical disc to form a beam spot thereon, and a signal detecting system that receives the laser beam which is reflected from the data recording layer and passes through the objective lens. The signal detecting system produces various signals based on the received laser beam.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When the recording/reproducing for the DVD having a higher recording density is performed, a smaller beam spot diameter is required on the data recording layer relative to the beam spot used for the CD having a lower recording density. For this reason, the optical pick-up is configured such that a NA (numerical aperture) is changed to a higher value to obtain a smaller beam spot diameter when the DVD is used and that the NA is changed to a lower value to obtain a larger beam spot diameter when the CD or CD-R is used.

In general, for the DVD, a laser beam having a wavelength range of 635–665 nm, which is lower than a wavelength range of 780–830 nm for the CD, is used because the beam spot diameter decreases as the wavelength of the laser beam decreases. When the CD-R is used, a laser beam having the wavelength of 780 nm is used due to reflectivity of a data recording layer of the CD-R.

As is well known, a condition of a spherical aberration in an optical system of the optical pick-up changes depending on a thickness of a cover layer of an optical disc being used. Therefore, it is required to correct the spherical aberration caused by replacement of optical discs having different thicknesses of cover layers.

Japanese Provisional Publication No. 2001-338431 discloses a CD/DVD compatible objective lens (i.e., an objective lens of an optical pick-up that can be used for both of the DVD and CD). The CD/DVD compatible objective lens has a diffracting structure on one of its lens surfaces. The diffracting structure has a plurality of concentric ring-shaped steps having a function of properly converging an incident beam on a data recording layer of an optical disc regardless of the thickness of a cover layer of the optical disc.

That is, the diffracting structure has wavelength dependence such that the spherical aberration changes depending on the wavelength of an incident beam. Consequently, the CD/DVD compatible objective lens is capable of supporting various types of optical discs having different thicknesses of the cover layers.

More specifically, a surface on which the diffracting structure is formed has an inner area which provides an NA required for an optical disc having relatively low recording density such as CD and has an outer area which is situated outside the inner area and which provides an NA required for an optical disc having relatively high recording density such as DVD.

The diffracting structure within the inner area has a function that a beam for CD is properly converged on the data recording layer of the CD and a beam for the DVD is properly converged on the data recording layer of the DVD. The diffracting structure within the outer area has a function that the beam for CD is not properly converged on the data recording layer of the CD and the beam for the DVD is most properly converged on the data recording layer of the DVD. Further, the diffracting structure within the outer area is configured such that a blazed wavelength is set substantially equal to the wavelength of the beam for DVD.

With the above mentioned structure, with regard to the beam for CD, only the beam for CD passed through the inner area properly converges on the data recording layer of the CD, while the beam for CD passed through the outer area diffuses on the data recording layer of the CD. Thus, the beam spot having relatively large diameter is formed on the data recording layer of the CD.

With regard to the beam for DVD, both of the inner and outer areas converge the beam passing therethrough on the data recording layer of the DVD. Thus, the beam spot having relatively small diameter is formed on the data recording layer of the DVD.

As described above, the CD/DVD compatible objective lens has excellent optical performance that it can be used for both of the DVD and CD and that the spherical aberration is corrected for both of the DVD and CD. However, the CD/DVD compatible objective has a problem that the beam for CD passed through the outer area of the objective lens may be detected by a detector of a servo mechanism after the diffused light is reflected from the data recording layer of the CD. If the diffused light reflected from the data recording layer of the CD is detected by the servo mechanism, a noise may be generated on a servo signal such as an AF (auto focus) signal, a TE (tracking error) signal and the like. In such a case, high-precision servo operation (i.e., optical pick-up operation) may be adversely affected.

SUMMARY OF THE INVENTION

The present invention is advantageous in that it provides an objective lens for an optical pick-up which supports recording/reproducing operation for various types of optical discs and which enhances performance of the optical pick-up.

According to an aspect of the present invention, there is provided an objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc. The objective lens has at least one surface on which a plurality of annular zones are formed. The at least one surface is divided into an inner area and an outer area outside the inner area, the inner area having a necessary size for providing a first NA required by the first optical disc, and the outer area having a necessary size for providing a second NA required by the second optical disc and higher than the first NA. Further, with regard to the light beam used for the second optical disc, an optical path difference generated between at least one of steps formed between adjacent annular zones of the plurality of annular zones within the outer area is lower by a predetermined amount than an integral multiple of the wavelength of the light beam used for the second optical disc.

With this configuration, the degree of divergence of the beam for the first optical disc (e.g., the CD) passed through the outer area can be increased. That is, the beam for the first optical disc passed through the outer area sufficiently diffuses on the data recording layer of the first optical disc. In this case, the intensity of diffused light of the beam for the first optical disc reflected by the data recording layer of the first optical disc is extremely low when the diffused light is detected by a detector provided in a servo mechanism. Accordingly, steady and high-precision optical pick-up operation can be secured.

Optionally, the optical path difference may satisfy a condition:

$$(n-0.4) \leq OPD/\lambda < n \quad (1)$$

where OPD is the optical path difference, $\lambda$ represents the wavelength of the light beam used for the second optical disc, and n represents a natural number.

When the OPD/$\lambda$ gets lower than the lower limit of the condition (1), a difference between the wavelength of the beam for the second optical disc (e.g., the DVD) and the OPD becomes too large, and therefore it becomes impossible to form a small beam spot required for the recording/reproducing operation for the second optical disc. When the OPD/$\lambda$ gets larger than or equal to the upper limit of the condition (1), the intensity of the diffused light of the beam for the first optical disc (e.g., the CD) becomes greater when the diffused light is detected by the detector of the servo mechanism, and therefore a noise may be introduced on a servo signal such as the AF signal and the TE signal.

Still optionally, the optical path difference OPD may satisfy a condition:

$$(n-0.25) \leq OPD/\lambda \leq (n-0.05) \quad (2).$$

In a particular case, the steps between adjacent annular zones of the plurality of annular zones are formed such that, at each step, an outside annular zone of a step protrudes with respect to an inside annular zone of the step. With this structure, it becomes possible, with regard to the recording/reproducing operation of the second optical disc (e.g., the DVD), to reduce changes of aberrations due to temperature variations.

In a particular case, the natural number n satisfies a condition:

$$1 \leq n \leq 6 \quad (5).$$

According to another aspect of the present invention, there is provided an objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc. The objective lens has at least one surface on which a plurality of phase shift surfaces are formed as a plurality of annular zones. The at least one surface is divided into an inner area and an outer area outside the inner area, the inner area having a necessary size for providing a first NA required by the first optical disc, and the outer area having a necessary size for providing a second NA required by the second optical disc and higher than the first NA. Further, with regard to the light beam used for the second optical disc, a phase shift amount generated by at least a pair of adjacent annular zones within the outer area is lower by a predetermined amount than an integral multiple of 2π.

With this configuration, the degree of divergence of the beam for the first optical disc (e.g., the CD) passed through the outer area can be increased. That is, the beam for the first optical disc passed through the outer area sufficiently diffuses on the data recording layer of the first optical disc. In this case, the intensity of diffused light of the beam for the first optical disc reflected by the data recording layer of the first optical disc is extremely low when the diffused light is detected by a detector provided in a servo mechanism. Accordingly, steady and high-precision optical pick-up operation can be secured.

Optionally, the phase shift amount may satisfy a condition:

$$2(n-0.4)\pi \leq \phi < 2n\pi \quad (3)$$

where $\phi$ is the phase shift amount, and n represents a natural number.

When the $\phi$ gets lower than the lower limit of the condition (3), it becomes impossible to form a small beam spot required for the recording/reproducing operation for the second optical disc. When the $\phi$ gets larger than or equal to the upper limit of the condition (3), the intensity of the diffused light of the beam for the first optical disc (e.g., the CD) becomes greater when the diffused light is detected by the detector of the servo mechanism, and therefore a noise may be introduced on a servo signal such as the AF signal and the TE signal.

Still optionally, the phase shift amount $\phi$ may satisfy a condition:

$$2(n-0.25)\pi \leq \phi \leq 2(n-0.05)\pi \quad (4).$$

In a particular case, steps may be formed between adjacent annular zones of the plurality of annular zones such that, at each step, an outside annular zone of a step protrudes with respect to an inside annular zone of the step. With this structure, it becomes possible, with regard to the recording/reproducing operation of the second optical disc (e.g., the DVD), to reduce changes of aberrations due to temperature variations.

In a particular case, the natural number n may satisfy a condition:

$$1 \leq n \leq 6 \quad (5).$$

According to another aspect of the present invention, there is provided an objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc. The objective lens has at least one surface on which a diffracting structure is formed as a plurality of annular zones. The at least one surface is divided into an inner area and an outer area outside the inner area, the inner area having a necessary size for providing a first NA required by the first optical disc, and the outer area having a necessary size for providing a second NA required by the second optical disc and higher than the first NA. Further, a blazed wavelength in the outer area is lower by a predetermined amount than an integral multiple of the wavelength of the light beam used for the second optical disc.

With this configuration, the degree of divergence of the beam for the first optical disc (e.g., the CD) passed through the outer area can be increased. That is, the beam for the first optical disc passed trough the outer area sufficiently diffuses on the data recording layer of the first optical disc. In this case, the intensity of diffused light of the beam for the first optical disc reflected by the data recording layer of the first optical disc is extremely low when the diffused light is detected by a detector provided in a servo mechanism. Accordingly, steady and high-precision optical pick-up operation can be secured.

Optionally, the blazed wavelength may satisfy a condition:

$$0.9 \leq \lambda_0/m\lambda < 1.0 \tag{6}$$

where $\lambda_0$ is the blazed wavelength, $\lambda$ represents the wavelength of the light beam used for the second optical disc, and m represents a diffraction order of the light beam used for the second optical disc diffracted by the diffracting structure within the outer area.

When the $\lambda_0/m\lambda$ gets lower than the lower limit of the condition (6), it becomes impossible to form a small beam spot required for the recording/reproducing operation for the second optical disc. When the $\lambda_0/m\lambda$ gets larger than or equal to the upper limit of the condition (6), the intensity of the diffused light of the beam for the first optical disc (e.g., the CD) becomes greater when the diffused light is detected by the detector of the servo mechanism, and therefore a noise may be introduced on a servo signal such as the AF signal and the TE signal.

In a particular case, the diffraction structure may have positive refractive power. With this structure, it becomes possible to reduce changes of aberrations due to temperature variations and to correct chromatic aberration.

BRIEF DESCRIPTION OF THE ACCOMPANYING DRAWINGS

FIG. 1 schematically shows an objective lens according to an embodiment of the invention;

Figure 6:
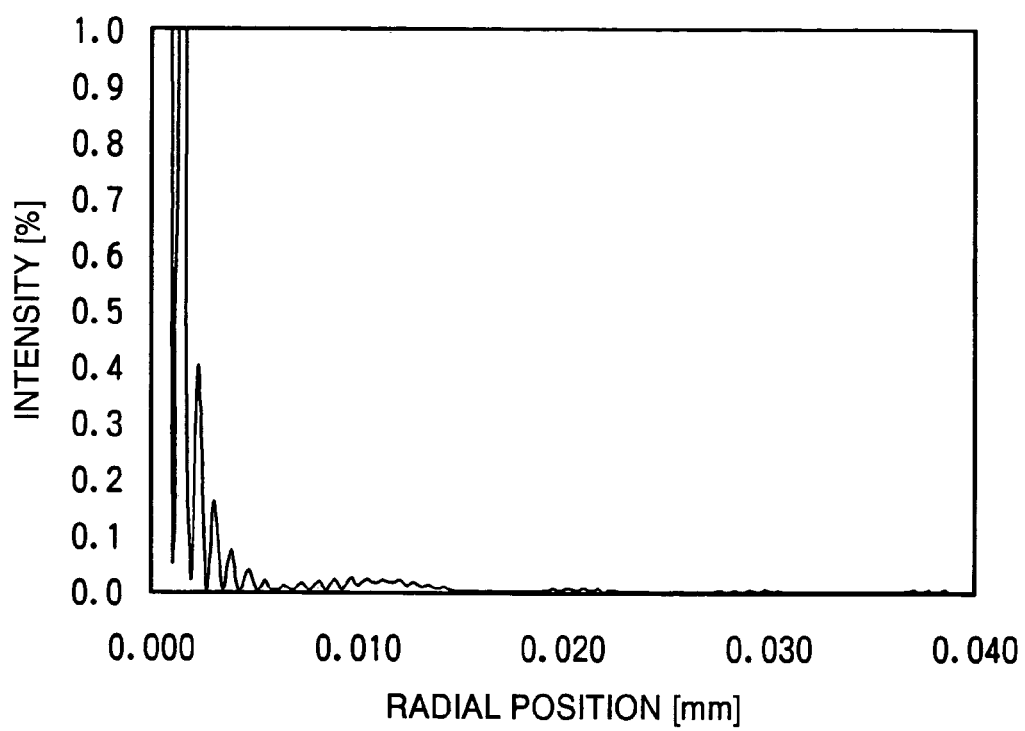
Figure 7:
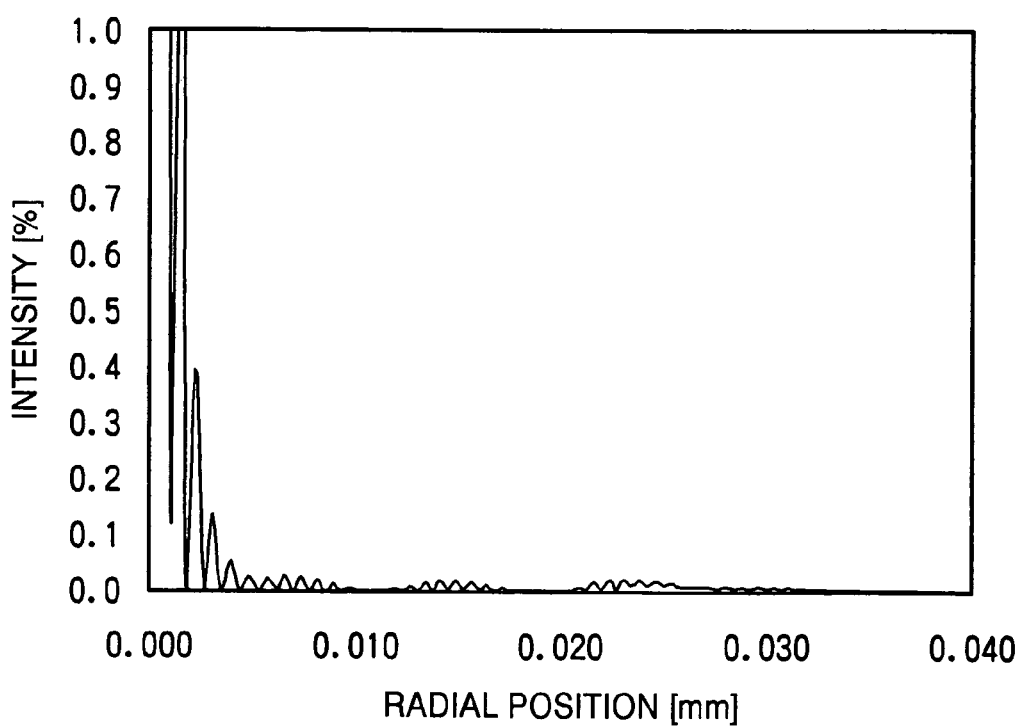

FIG. 6 is a graph illustrating the intensity distribution of a beam spot which a beam having relatively long wavelength passed through the objective lens of a forth example forms on a data recording layer of an optical disc having relatively thick cover layer; and FIG. 7 is a graph illustrating the intensity distribution of a beam spot which a beam having relatively long wavelength passed through the objective lens of a fifth example forms on a data recording layer of an optical disc having relatively thick cover layer.

DETAILED DESCRIPTION OF THE EMBODIMENTS

Hereinafter, an embodiment according to the invention is described with reference to the accompanying drawings.

Technical terms used herein are defined as follows. "A diffracting structure" is defined as a diffraction grating which is blazed so that light of a certain diffraction order is principally produced. The blazed diffraction grating is optimized its shape and/or refractive index so that an optical path length difference generated at a boundary between adjacent sections on the diffraction grating takes a value of a certain wavelength $\lambda$ multiplied by m (m: natural number). Therefore, a characteristic of the blazed diffraction grating can also be described as "a blazed diffraction grating gives a phase difference of $2m\pi$ at each boundary between adjacent sections thereon".

In such a structure of the blazed diffraction grating, optical path differences (phase differences) generated at boundaries between adjacent sections are not necessarily required to be uniform, but in general such optical path differences are set uniform to have the same optical path difference of $m\lambda$ (i.e., to have the same phase difference $2m\pi$ for light having the wavelength $\lambda$). With this structure, when light having wavelength of about $\lambda$ is incident on the blazed diffraction grating, m order diffracted light is generated most intensely of all orders of diffracted light.

More specifically, when light having a wavelength of $\lambda$ enters from a first material having a refractive index n1 for light having a wavelength of $\lambda$ to a second material having a refractive index n2 for light having a wavelength of $\lambda$ perpendicularly to the second material, if each step formed at each boundary is set to have a height of $m\lambda/(n2-n1)$, m order diffracted light is generated most intensely of all orders of diffracted light. Hereafter, $m\lambda$ is referred to as a blazed wavelength.

Further, if at least one lens surface of a lens has a phase shifting structure in which the lens surface is divided into a plurality of regions within an effective diameter of the lens surface so that light is phase shifted at each boundary between adjacent regions, such a lens is referred to as a phase shift lens. Although in general a diffractive lens can be put in the category of the phase shift lens, hereafter the term "diffractive lens" means one which satisfies a condition that a variation of intervals between boundaries of the regions on the lens is expressed by a relatively simple function of the order of up to about $12^{th}$ and that the phase differences given at the boundaries are the same. By contrast, a lens having the grating structure and not satisfying the above condition is referred to as the phase shift lens hereafter.

Figure 1:
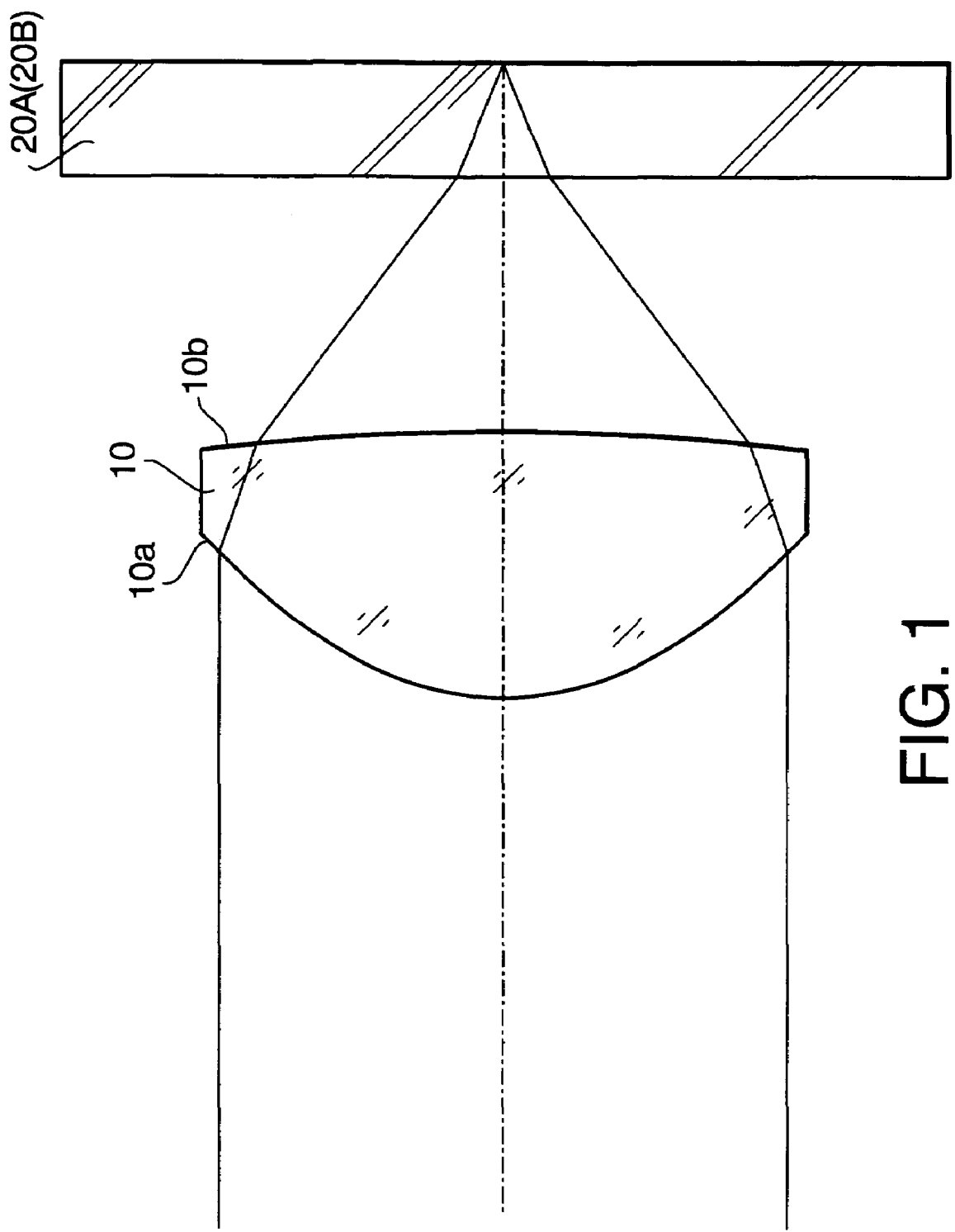

FIG. 1 schematically shows an objective lens 10 and an optical disc according to the embodiment of the invention. The objective lens 10 is employed in an optical recording/reproducing devise (not shown) which supports various types of optical discs having different thicknesses and recording densities.

In FIG. 1, an optical disc 20A (20B) which is placed on a turn table (not shown) to rotate about its central axis is also shown. The optical disc 20A is an optical disc having a relatively low recording density and a relatively thick cover layer (for example, the CD or CD-R). The optical disc 20B is an optical disc having a relatively high recording density and a relatively thin cover layer (for example, the DVD).

When recording or reproducing operation for the optical disc 20A is performed, a first beam having relatively long wavelength emitted by a first laser source (not shown) is used so as to form relatively large beam spot on a data recording layer of the optical disc 20A. Meanwhile, when recording or reproducing operation for the optical disc 20B is performed, a second beam having relatively short wavelength emitted by a second laser source (not shown) is used so as to form a relatively small beam spot on a data recording layer of the optical disc 20B.

Between the first or second laser source and the objective lens 10, a collimator lens (not shown) is provided. Therefore, as shown in FIG. 1, the first (second) beam emitted by the first (second) laser source is collimated by the collimator lens and then is incident on the objective lens 10.

As shown in FIG. 1, the objective lens 10 is a biconvex plastic single-element lens having a front surface 10a and a rear surface 10b, each of which has an aspherical surface.

As is well known, a spherical aberration changes when the thickness of a cover layer of an optical disc changes. For correcting the change of the spherical aberration, at least one of surfaces of the objective lens 10 is provided with the diffracting structure. That is, at least one of surfaces of the objective lens 10 has a plurality of concentric annular zone in which minute steps are formed between adjacent annular zones. As described later, in this embodiment the front surface 10a is provided with the diffracting structure.

Figure 2:
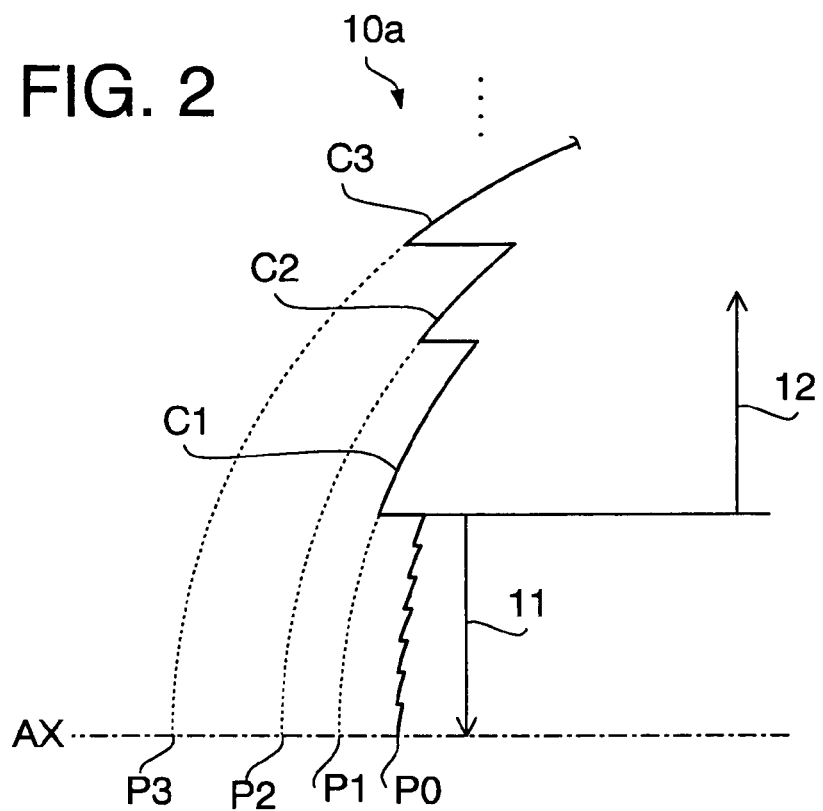
FIG. 2 shows a portion of a cross section of the objective lens cut along a plane including an optical axis of the objective lens.

FIG. 2 shows a portion of a cross section of the objective lens 10 cut along a plane including an optical axis AX of the objective lens 10. It should be noted that sizes of the annular zones particularly in an optical axis AX direction are exaggerated for the sake of simplicity.

As shown in FIG. 2, the front surface 10a has an inner area 11 including a center of the front surface 10a and has an outer area 12 formed outside the inner area 11. Both of the inner area 11 and the outer area 12 have the annular zones. As can be seen from FIG. 2, the annular zones formed within the inner and outer areas 11 and 12 have steps between adjacent zones, and at each step the thickness of the objective lens 10 changes in an increasing direction. That is, at each step, the outside annular zone of a step protrudes with respect to the inside annular zone of the step.

The diffracting structure within the inner area 11 is formed to have a certain blazed wavelength so that the NA required for the recording/reproducing of the optical disc 20A (e.g., CD) is attained. That is, the certain blazed wavelength in the inner area 11 may be set substantially equal to the wavelength of the first beam if it is particularly required to increase efficiency of use of the first beam. Alternatively, the certain blazed wavelength in the inner area 11 may be set substantially equal to the wavelength of the second beam if it is particularly required to increase efficiency of use of the second beam. Alternatively, the certain blazed wavelength in the inner area 11 may be set equal to a medium value between the wavelength of the first beam and the wavelength of the second beam so that relatively high efficiency of use for both of the first and second beams can be attained.

As shown in FIG. 2, the outer area 12 has a plurality of annular zones (C1, C2, C3, . . . ). The annular zones (C1, C2, C3, . . . ) are respectively formed as parts of aspherical surfaces which are individually defined by respective aspherical coefficients. As indicated in detail below, the objective lens 10 may be formed to be the phase shift lens or the diffractive lens.

The outer area 12 is configured such that at least one of the steps formed between adjacent annular zones produces the optical path difference slightly smaller than integral multiples of the wavelength of the second beam. More specifically, the optical path difference OPD produced by the at least one of the steps within the outer area 12 satisfies a condition:

$$(n-0.4) \leq OPD/\lambda < n \qquad (1)$$

where λ represents the wavelength of the second beam, and n represents a natural number.

By satisfying the condition (1), the objective lens 10 can have advantages that: the objective lens 10 provides a high NA for the second beam passing therethrough within both of the inner and outer areas 11 and 12 to form a sufficiently small beam spot on the data recording layer of the optical disk 20B; and the amount of diffusion of the first beam passing through the outer area 12 can be increased in comparison with a case in which the blazed wavelength in the outer area 12 is set to be the integral multiple of the wavelength of the second beam for the optical disc 20B.

Accordingly, even if diffused light of the first beam (i.e., light produced as a result of diffusion of the first beam by the outer area and reflection by the data recording layer of the first optical disc 20A) is detected by a detector of a servo mechanism (not shown) provided in the optical recording/reproducing devise, the intensity of the diffused light detected by the detector becomes negligible, and a noise introduced on a servo signal (e.g., the AF signal) can be significantly reduced. That is, a steady and high-precision optical pick-up operation can be secured.

The optical path difference OPD produced by the at least one of the steps within the outer area 12 may further satisfy a condition:

$$(n-0.25) \leq OPD/\lambda \leq (n-0.05) \qquad (2).$$

If the condition (2) is satisfied, the above mentioned advantages of the objective lens are enhanced.

The above mentioned configuration of the outer area 12 of the objective lens 10 is also explained as follows using a phase shift amount when the annular zones in the outer area 12 are considered as phase shift surfaces. That is, the outer area 12 is configured such that at least one of the annular zones formed as phase shift surfaces gives a phase shift amount of an integral multiple of 2π to the second beam passing therethrough. More specifically, the phase shift amount φ given by the at least one pair of adjacent phase shift surfaces in the outer area 12 satisfies a condition:

$$2(n-0.4)\pi \leq \phi < 2n\pi \qquad (3)$$

where n represents a natural number.

The phase shift amount φ given by the at least one pair adjacent phase shift surfaces may further satisfy a condition:

$$2(n-0.25)\pi \leq \phi \leq 2(n-0.05)\pi \qquad (4).$$

If the condition (4) is satisfied, the above mentioned advantages of the objective lens 10 are enhanced.

Preferably, the natural number n used in the above conditions satisfies a condition:

$$1 \leq n \leq 6 \qquad (5).$$

The height of the steps between the adjacent annular zones in the outer area 12 depends on the natural number n. Therefore, if the condition (5) is satisfied, the height of the steps can be kept relatively small. Therefore, if the condition (5) is satisfied, the manufacturing process of the objective lens 12 can be eased.

The objective lens 10 may be configured such that all of the optical path differences formed by the steps between the adjacent annular zones in the outer area 12 are set equal to each other. That is, the objective lens 10 may be configured as a diffractive lens. When the objective lens 10 is configured to be the diffractive lens, the blazed wavelength in the outer area 12 is set slightly smaller than the wavelength of an integral multiple of the wavelength of the second beam. More specifically, the blazed wavelength $\lambda_0$ of the outer area 12 is set to satisfy a condition:

$$0.9 \leq \lambda_0/m\lambda < 1.0 \qquad (6)$$

where λ represents a design wavelength of the second beam, and m represents the diffraction order of the second beam to be used for the recording/reproducing of the optical disk 20B (e.g., the DVD).

To increase the intensity of a diffracted beam to be used, the steps between the adjacent annular zones in the outer area 12 are formed such that, at each step, the outside annular zone protrudes with respect to the inside annular zone both in the case where the objective lens 10 is configured to be the phase shift lens and in the case where the objective lens 10 is configured to be the diffractive lens.

That is, in the case where the objective lens 10 is configured to be the diffractive lens, the diffracting structure in the outer area 12 is designed to have positive power. In this case, variations of aberrations due to temperature variations can be reduced, and a chromatic aberration can be corrected sufficiently.

Hereafter, five concrete numerical examples will be explained. In each example, the optical disc 20A has the cover layer with the thickness of 1.2 mm, and the optical disc 20B has the cover layer with the thickness of 0.6 mm. In each of first and second examples, the objective lens 10 is configured to be the diffractive lens having the diffracting structure. In each of third, fourth and fifth examples, the objective lens 10 is configured to be the phase shift lens considered as a collection of a plurality of aspherical surfaces individually configured to have respective aspherical coefficients.

FIRST EXAMPLE

FIG. 1 schematically shows an optical system having the objective lens 10 according the first example (and second through fifth examples) and the optical disc 20A (20B). Tables 1 and 2 show a numerical configuration of the optical system shown in FIG. 1.

TABLE 1

|  | Optical disc 20A | Optical disc 20B |
|---|---|---|
| Design wavelength | 790 nm | 655 nm |
| $f_{OBL}$ | 2.52 | 2.50 |
| NA | 0.48 | 0.60 |

TABLE 2

| Surface Number | r | d1 | d2 | nd | vd |
|---|---|---|---|---|---|
| #1 | Special surface | 1.40 |  | 1.5436 | 55.7 |
| #2 | −6.940 | 0.97 | 1.33 |  |  |
| #3 | ∞ | 1.20 | 0.60 | 1.5855 | 29.9 |
| #4 | ∞ |  | — |  |  |

In Table 1, the design wavelength is a wavelength suitable for the recording/reproducing of the optical disc 20A or the optical disc 20B, $f_{OBL}$ represents a focal length (unit: mm) of the objective lens 10, NA represents a numerical aperture with regard to an image side of the objective lens 10. All values indicated in the Table 1 and 2 also apply to the second through fifth examples described below.

In Table 2, "surface number" represents a surface number of lens surfaces in the optical system shown in FIG. 1. The surfaces #1 and #2 represent the front surface 10a and the rear surface 10b of the objective lens 10, respectively. The surfaces #3 and #4 represent a front surface (a laser source side) and a rear surface of the cover layer of the optical disc 20A (or 20B), respectively. The "r" represents a radius of curvature (unit: mm) of each lens surface on the optical axis. The "d1" represents a distance (unit: mm) from a lens surface to a next lens surface (i.e., the thickness of a lens or an interval of optical parts) with regard to the optical disk 20A. The "d2" represents a distance (unit: mm) from a lens surface to a next lens surface with regard to the optical disk 20B. The "nd" represents a refractive index with respect to a d-ray (wavelength of 588 nm), and vd represents an Abbe number with respect to the d-ray.

The front surface 10a (#1) (i.e., a base curve of the front surface 10a) and the rear surface 10b (#2) of the objective lens 10 are rotationally-symmetrical aspherical surfaces. The rotationally-symmetrical aspherical surface is expressed by a following equation:

$$X(h) = \frac{ch^2}{1 + \sqrt{1 - (1+K)c^2h^2}} + A_4h^4 + A_6h^6 + A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

The conical coefficient and aspherical coefficients of the front and the rear surfaces 10a (#1) and 10b (#2) of the objective lens 10 are indicated in the following Table 3. As indicate in Table 3, the coefficients of the inner area 11 and the coefficients of the outer area 12 of the front surface 10a (#1) are determined individually. In this first example, the inner area 11 is an area formed within the height h from the optical axis smaller than 1.20 mm, the outer area 12 is an area formed within the height h from the optical axis larger than 1.20 mm.

TABLE 3

| Surface No. | #1 (h < 1.20) (inner area) | #1 (h > 1.20) (outer area) | #2 |
|---|---|---|---|
| r | 1.554 | 1.548 | −6.940 |
| K | −0.500 | −0.500 | 0.000 |
| A04 | −4.89100 × 10$^{-3}$ | −7.01000 × 10$^{-3}$ | 3.35000 × 10$^{-2}$ |
| A06 | −1.95300 × 10$^{-3}$ | −5.60000 × 10$^{-4}$ | −1.64000 × 10$^{-2}$ |
| A08 | −1.25000 × 10$^{-4}$ | 1.53000 × 10$^{-4}$ | 3.96000 × 10$^{-3}$ |
| A10 | −3.20000 × 10$^{-4}$ | −3.48000 × 10$^{-4}$ | −4.13000 × 10$^{-4}$ |
| A12 | 0.00000 × 10$^{+0}$ | 0.00000 × 10$^{+0}$ | 0.00000 × 10$^{+0}$ |

The diffracting structure formed on the front surface 10a (#1) of the objective lens 10 is defined by an optical path difference function Φ(h) which is defined by:

$$\Phi(h) = (P_2h^2 + P_4h^4 + P_6h^6 + \ldots) \times m \times \lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure.

Table 4 shows values of the coefficients of the optical path difference function Φ(h) applied to the front surface 10a (#1) of the objective lens 10.

TABLE 4

| Surface No. | #1 (h < 1.20) (inner area) | #1 (h > 1.20) (outer area) |
|---|---|---|
| P02 | $1.00000 \times 10^{+0}$ | $2.02900 \times 10^{+0}$ |
| P04 | $-5.09000 \times 10^{+0}$ | $-6.82000 \times 10^{+0}$ |
| P06 | $-9.20000 \times 10^{-1}$ | $5.50000 \times 10^{-1}$ |
| P08 | $0.00000 \times 10^{+0}$ | $0.00000 \times 10^{+0}$ |
| P10 | $0.00000 \times 10^{+0}$ | $0.00000 \times 10^{+0}$ |
| P12 | $0.00000 \times 10^{+0}$ | $0.00000 \times 10^{+0}$ |
| m | 1 | 1 |
| $\lambda_0$ | 790 nm | 600 nm |

In Table 4, with regard to the inner area 11, "m" represents a diffraction order used for the recording/reproducing of both of the optical discs 20A and 20B. With regard to the outer area 12, "m" represents a diffraction order used for the recording/reproducing of the optical disc 20B. That is, in the inner area 11, the diffracted light of the same diffraction order is used for both of the first and second beams. The "$\lambda_0$" represents the blazed wavelength.

As indicated in Table 4, in the first example the first order diffracted light of the second beam is used for the recording/reproducing of the optical disc 20B. For this reason, the outer area 12 is formed to have the blazed wavelength $\lambda_0$ of 600 nm so that the first order diffracted light of the second beam is produced most intensely of all of the diffraction orders of the second beam. In the first example, the $\lambda_0/m\lambda$ ($\lambda_0=600$, m=1, $\lambda=655$) of the condition (6) takes a value of 0.916. Therefore, the objective lens 10 according to the first example satisfies the condition (6).

Figure 3:
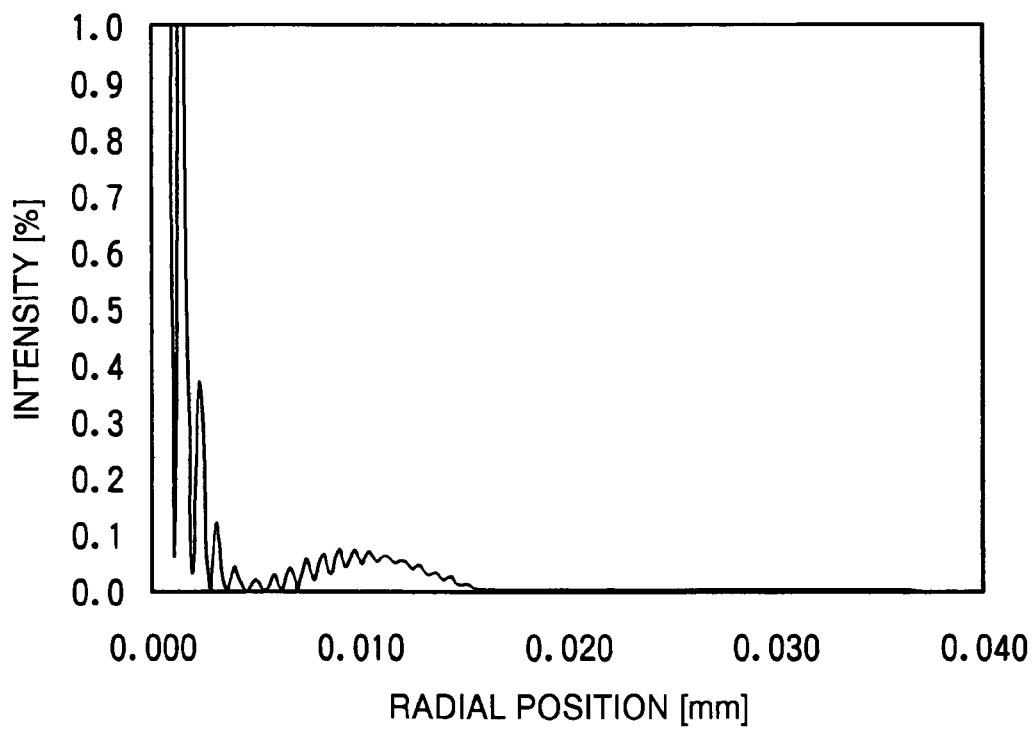
FIG. 3 is a graph illustrating the intensity distribution of a beam spot which a beam having relatively long wavelength passed through the objective lens of a first example forms on a data recording layer of an optical disc having relatively thick cover layer.

FIG. 3 is a graph illustrating the intensity distribution of the beam spot which the first beam (having relatively long wavelength) passed through the objective lens 10 of the first example forms on the data recording layer of the optical disc 20A (having relatively thick cover layer). In FIG. 3, a vertical axis represents the intensity (unit: %) when the center intensity of the beam spot is considered as 100%, and a horizontal axis represents a radial position (unit:mm) from the center of the beam spot.

As shown in FIG. 3, the intensity of the beam spot of the first beam at the radial position of about 0.010 mm is suppressed to have a value smaller than 0.1%. Accordingly, with regard to the use of the first beam for the optical disc 20A, even if light other than the beam spot center is detected by the servo mechanism after the light other than the beam spot center is reflected from the data recording layer of the optical disc 20A, the intensity of the light other than the beam spot center detected by the servo mechanism is significantly low. That is, the light other than the beam spot center can not cause a noise on the servo signal such as the AF signal. Thus, according to the objective lens of the first example, the steady and the high-precision optical pick-up operation is secured.

As described above, the objective lens 10 of the first example is configured such that the optical path differences OPD generated at all of the steps between the adjacent annular zones take the same value in the outer area 12, and that the phase shift amounts φ generated at all of the steps between the adjacent annular zones also take the same value in the outer area. That is, the objective lens 10 of the first example meets the requirement as the diffractive lens in the outer area 12.

Since the objective lens 10 of the first example has the optical path difference OPD of 600 nm and the design wavelength λ of the second beam is 655 nm (see Table 1), OPD/λ is 0.916. Accordingly, the objective lens 10 of the first example satisfies the conditions (1) and (2) (where the natural number n=1).

Further, since in this example the phase shift amount φ is 1.83π, the objective lens 10 of the first example also satisfies the conditions (3) and (4). As described above, the "n" is 1 in this example. Therefore, the objective lens 10 of the first example also satisfies the condition (5).

SECOND EXAMPLE

A second example according to the embodiment of the invention will be described. Since the numerical configuration of the optical system of the second example is the same as that of the first example shown in Tables 1 and 2 and the shapes of the aspherical surfaces of the front and rear surfaces 10a and 10b of the objective lens 10 according to the second example are the same as those of the first example shown in Table 3, the explanations thereof are not repeated.

Table 5 shows values of the coefficients of the optical path difference function Φ(h) applied to the inner area 11 and the outer are 12 of front surface 10a (#1) according to the second example. Symbols shown in Table 5 have the same meanings as those shown in Table 3. As shown in Table 5, the inner area 11 is formed within the height h from the optical axis smaller than 1.20 mm, and the outer area 12 is formed within the height h from the optical axis larger than 1.20 mm.

TABLE 5

| Surface No. | #1 (h < 1.20) (inner are) | #1 (h > 1.20) (outer area) |
|---|---|---|
| P02 | $1.00000 \times 10^{+0}$ | $6.76333 \times 10^{-1}$ |
| P04 | $-5.09000 \times 10^{+0}$ | $-2.27333 \times 10^{+0}$ |
| P06 | $-9.20000 \times 10^{-1}$ | $1.83333 \times 10^{-1}$ |
| P08 | $0.00000 \times 10^{+0}$ | $0.00000 \times 10^{+0}$ |
| P10 | $0.00000 \times 10^{+0}$ | $0.00000 \times 10^{+0}$ |
| P12 | $0.00000 \times 10^{+0}$ | $0.00000 \times 10^{+0}$ |
| M | 1 | 3 |
| $\lambda_0$ | 790 nm | 1800 nm |

As shown in Table 5, the third order diffracted light of the second beam is used for the recording/reproducing of the second disc 20B (e.g., the DVD). For this reason, the outer area 12 is formed to have the blazed wavelength $\lambda_0$ of 1800 nm so that the third order diffracted light is produced most intensely of all of the diffraction orders of the second beam. In the second example, the $\lambda_0/m\lambda$ ($\lambda_0=1800$, m=3, $\lambda=655$) of the condition (6) takes a value of 0.916. Therefore, the objective lens 10 according to the second example satisfies the condition (6).

Figure 4:
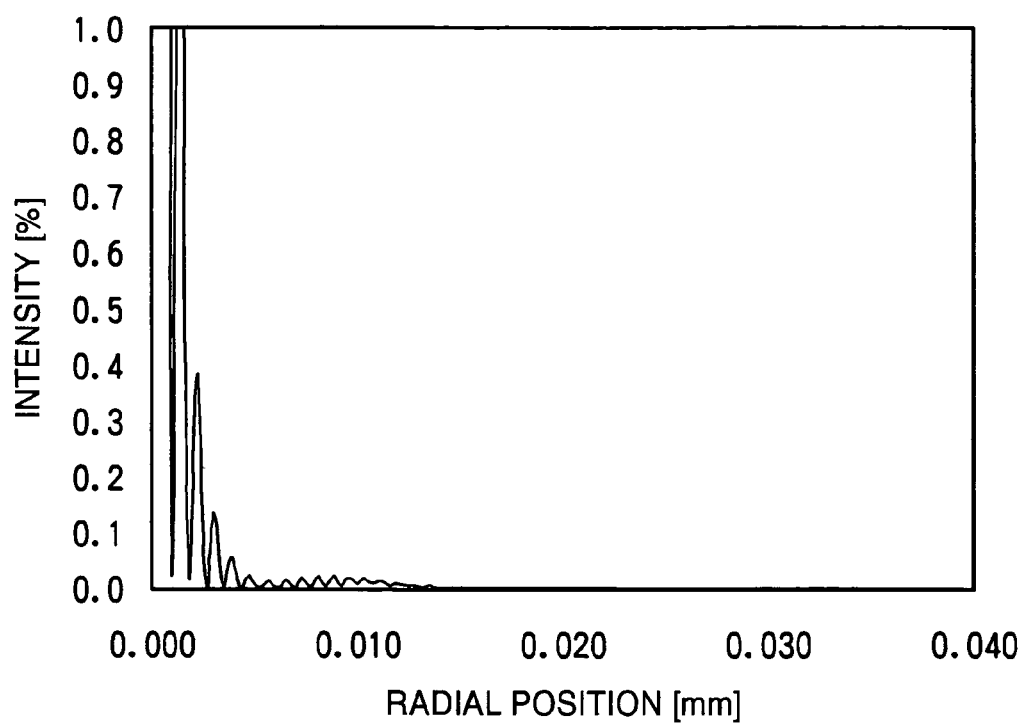
FIG. 4 is a graph illustrating the intensity distribution of a beam spot which a beam having relatively long wavelength passed through the objective lens of a second example forms on a data recording layer of an optical disc having relatively thick cover layer.

FIG. 4 is a graph illustrating the intensity distribution of the beam spot which the first beam (having relatively long wavelength) passed through the objective lens 10 of the second example forms on the data recording layer of the optical disc 20A (e.g., the CD). In FIG. 4, a vertical axis represents the intensity (unit: %) when the center intensity of the beam spot is considered as 100%, and a horizontal axis represents a radial position (unit:mm) from the center of the beam spot.

From the view point of the general distribution of the intensity of the beam spot shown in FIG. 4, the intensity decreases gradually, as the radial distance from the beam spot center increases. Further, the intensity of the beam spot of the first beam at the radial position about 0.010 mm away from the beam spot center is sufficiently suppressed to have a value smaller than 0.05%.

Accordingly, with regard to the use of the first beam for the optical disc 20A (e.g., the CD), there is almost no possibility that light other than the beam spot center is detected by the servo mechanism after the light other than the beam spot center is reflected from the data recording layer of the optical disc 20A. That is, the light other than the beam spot center can not cause a noise on the servo signal such as the AF signal. Thus, according to the objective lens 10 of the second example, the steady and the high-precision optical pick-up operation is secured.

As described above, the objective lens 10 of the second example is configured such that the optical path differences OPD generated at all of the steps between the adjacent annular zones take the same value in the outer area, and that the phase shift amounts $\phi$ generated at all of the steps between the adjacent annular zones also take the same value in the outer area 12. That is, the objective lens 10 of the second example meets the requirement as the diffractive lens in the outer area 12.

Since the objective lens 10 of the second example has the optical path difference OPD of 1800 nm and the design wavelength $\lambda$ of the second beam is 655 nm (see Table 1), OPD/$\lambda$ is 2.748. Accordingly, the objective lens 10 of the second example satisfies the condition (1) (where the natural number n=3).

Further, since in this example the phase shift amount $\phi$ is 5.496$\pi$, the objective lens 10 of the second example satisfies the condition (3) (where the natural number n=3). Since the "n" is 3 in this example, the objective lens 10 of the second example also satisfies the condition (5).

THIRD EXAMPLE

A third example according to the embodiment of the invention will be described. Since a numerical configuration of an optical system of the third example is the same as that of the first example shown in Tables 1 and 2, the explanation thereof is not repeated.

Further, the configuration (i.e., the aspherical surface shape and the diffracting structure) of the front surface 10a of the objective lens 10 within the inner area 11 of the third example is the same as that of the first example shown in Tables 3 and 4, and the aspherical surface shape of the rear surface 10b of the objective lens 10 of the third example is the same as that of the first example. Therefore, detailed explanations of the inner area 11 of the front surface 10a of the objective lens 10 and the rear surface 10b of the objective lens 10 are not repeated.

In the third example, the objective lens 10 has five annular zones C1 through C5 on the front surface 10a within the outer area 12. As described above, the annular zones C1–C5 are formed as the parts of the respective aspherical surface. Table 6 shows the numerical structures of the five aspherical surfaces C1 through C5.

TABLE 6

| Annular zone | C1 | C2 | C3 |
|---|---|---|---|
| h | 1.200 ≦ h < 1.280 | 1.280 ≦ h < 1.320 | 1.320 ≦ h < 1.395 |
| r | 1.56453 | 1.56492 | 1.56608 |
| K | −0.500 | −0.500 | −0.500 |
| A04 | $1.57069 \times 10^{-3}$ | $1.57238 \times 10^{-3}$ | $1.57746 \times 10^{-3}$ |
| A06 | $-1.77062 \times 10^{-3}$ | $-1.77323 \times 10^{-3}$ | $-1.78108 \times 10^{-3}$ |
| A08 | $1.01646 \times 10^{-3}$ | $1.01842 \times 10^{-3}$ | $1.02431 \times 10^{-3}$ |
| A10 | $-5.88554 \times 10^{-4}$ | $-5.88408 \times 10^{-4}$ | $-5.87969 \times 10^{-4}$ |
| A12 | $2.38485 \times 10^{-5}$ | $2.39169 \times 10^{-5}$ | $2.41223 \times 10^{-5}$ |
| d_shift | −0.01326 | −0.01437 | −0.01768 |

| Annular zone | C4 | C5 |
|---|---|---|
| h | 1.395 ≦ h < 1.477 | 1.477 ≦ h < 1.500 |
| r | 1.56763 | 1.56879 |
| K | −0.500 | −0.500 |
| A04 | $1.58423 \times 10^{-3}$ | $1.58931 \times 10^{-3}$ |
| A06 | $-1.79154 \times 10^{-3}$ | $-1.79938 \times 10^{-3}$ |
| A08 | $1.03215 \times 10^{-3}$ | $1.03804 \times 10^{-3}$ |
| A10 | $-5.87385 \times 10^{-4}$ | $-5.86946 \times 10^{-4}$ |
| A12 | $2.43962 \times 10^{-5}$ | $2.46015 \times 10^{-5}$ |
| d_shift | −0.02210 | −0.02542 |

In Table 6, "d_shift" represents a shift amount of each of vertexes of hypothetical aspherical surfaces (see dotted curves in FIG. 2) of the annular zones (C1–C5) with respect to a vertex of the front surface 10a in the inner area. That is, the "d_shift" represents a distance between a point (P1, P2, P3 . . . ) at which each of the hypothetical aspherical surfaces of the annular zones intersects with the optical axis AX and a point P0 which is an intersection of the front surface 10a and the optical axis AX.

Table 7 indicates optical path differences (phase shift amounts) generated between adjacent annular zones in the outer area 12 of the objective lens 10 of the third example.

TABLE 7

| | OPD/$\lambda$ | n | $\phi$ |
|---|---|---|---|
| C1–C2 | 0.92 | 1 | 1.83$\pi$ |
| C2–C3 | 2.75 | 3 | 5.50$\pi$ |
| C3–C4 | 3.66 | 4 | 7.33$\pi$ |
| C4–C5 | 2.75 | 3 | 5.50$\pi$ |

As can be seen from Table 7, all of the optical path differences generated adjacent annular zones in the outer area 12 satisfy the condition (1). Further, the optical path difference generated between the annular zone C1 and the annular zone C2 satisfies the condition (2).

As can be seen from Table 7, all of the phase shift amounts generated adjacent annular zones in the outer area 12 satisfy the condition (3). Further, the phase shift amount generated between the annular zone C1 and the annular zone C2 satisfies the condition (4). Since all values of "n" shown in Table 7 are smaller than six, the objective lens 10 of the third example satisfies the condition (5).

Figure 5:
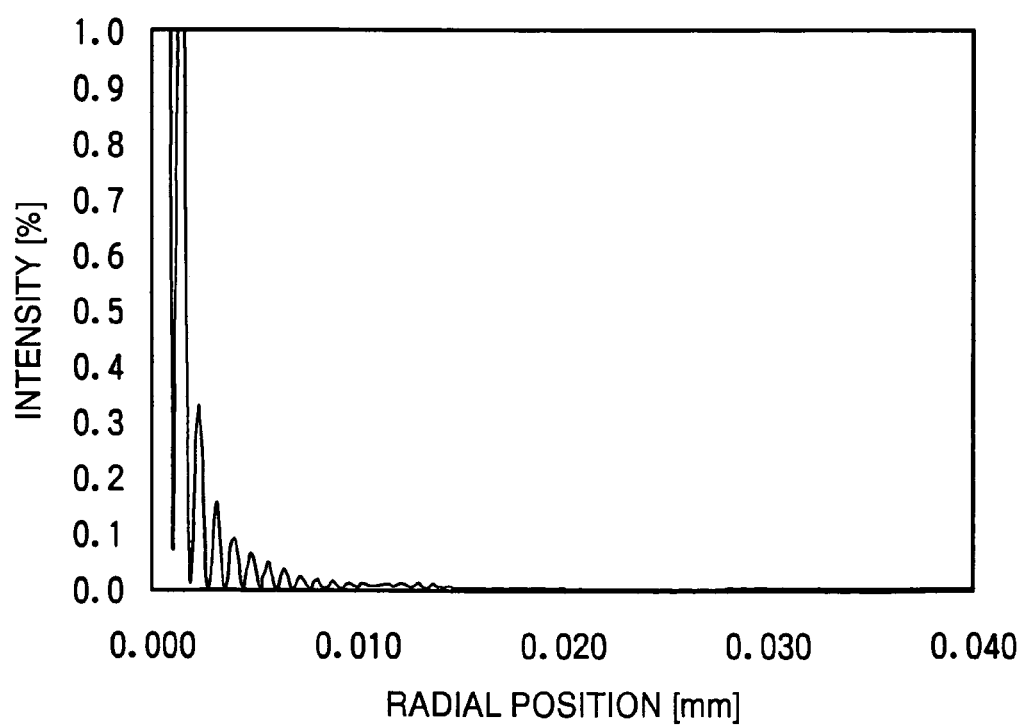
FIG. 5 is a graph illustrating the intensity distribution of a beam spot which a beam having relatively long wavelength passed through the objective lens of a third example forms on a data recording layer of an optical disc having relatively thick cover layer.

FIG. 5 is a graph illustrating the intensity distribution of the beam spot which the first beam (having relatively long wavelength) passed through the objective lens 10 of the third example forms on the data recording layer of the optical disc 20A (e.g., the CD). In FIG. 5, a vertical axis represents the intensity (unit: %) when the center intensity of the beam spot is considered as 100%, and a horizontal axis represents a radial position (unit:mm) from the center of the beam spot.

From the view point of the general distribution of the intensity of the beam spot shown in FIG. 5, the intensity decreases gradually, as the radial distance from the beam spot center increases. The intensity of the beam spot of the first beam at the radial position about 0.010 mm away from the beam spot center is substantially equal to zero.

Accordingly, with regard to the use of the first beam for the optical disc 20A (e.g., the CD), there is almost no possibility that light other than the beam spot center is detected by the servo mechanism after the light other than the beam spot center is reflected from the data recording layer of the optical disc 20A. That is, the light other than the beam spot center can not cause a noise on the servo signal such as the AF signal. Thus, according to the objective lens 10 of the third example, the steady and the high-precision optical pick-up operation is secured.

FOURTH EXAMPLE

A fourth example according to the embodiment of the invention will be described. Since a numerical configuration of an optical system of the fourth example is the same as that of the first example shown in Tables 1 and 2, the explanation thereof is not repeated.

Further, the configuration (i.e., the aspherical surface shape and the diffracting structure) of the front surface 10a of the objective lens 10 within the inner area 11 of the fourth example is the same as that of the first example shown in Tables 3 and 4, and the aspherical surface shape of the rear surface 10b of the objective lens 10 of the fourth example is the same as that of the first example. Therefore, detailed explanations of the inner area 11 of the front surface 10a of the objective lens 10 and the rear surface 10b of the objective lens 10 are not repeated.

In the fourth example, the objective lens 10 has five annular zones C1 through C5 on the front surface 10a within the outer area 12. As described above, the annular zones C1–C5 are formed as the parts of the respective aspherical surface. Table 6 shows the numerical structures of the aspherical surfaces C1 through C5.

TABLE 8

| Annular zone | C1 | C2 | C3 |
|---|---|---|---|
| h | $1.200 \leq h < 1.300$ | $1.300 \leq h < 1.370$ | $1.370 \leq h < 1.430$ |
| r | 1.56453 | 1.56569 | 1.56685 |
| K | −0.500 | −0.500 | −0.500 |
| A04 | $1.57069 \times 10^{-3}$ | $1.57577 \times 10^{-3}$ | $1.58085 \times 10^{-3}$ |
| A06 | $-1.77062 \times 10^{-3}$ | $-1.77846 \times 10^{-3}$ | $-1.78631 \times 10^{-3}$ |
| A08 | $1.01646 \times 10^{-3}$ | $1.02235 \times 10^{-3}$ | $1.02823 \times 10^{-3}$ |
| A10 | $-5.88554 \times 10^{-4}$ | $-5.88115 \times 10^{-4}$ | $-5.87677 \times 10^{-4}$ |
| A12 | $2.38485 \times 10^{-5}$ | $2.40538 \times 10^{-5}$ | $2.42592 \times 10^{-5}$ |
| d_shift | −0.01326 | −0.01658 | −0.01989 |

| Annular zone | C4 | C5 |
|---|---|---|
| H | $1.430 \leq h < 1.477$ | $1.477 \leq h < 1.500$ |
| r | 1.56880 | 1.56965 |
| K | −0.500 | −0.500 |
| A04 | $1.43777 \times 10^{-3}$ | $1.43592 \times 10^{-3}$ |
| A06 | $-5.63514 \times 10^{-4}$ | $-5.60905 \times 10^{-4}$ |
| A08 | $1.81045 \times 10^{-4}$ | $1.79748 \times 10^{-4}$ |
| A10 | $-2.97400 \times 10^{-4}$ | $-2.95400 \times 10^{-4}$ |
| A12 | $-1.37515 \times 10^{-5}$ | $-1.37838 \times 10^{-5}$ |
| d_shift | −0.02544 | −0.02787 |

In Table 8, "d_shift" has the same meanings as that shown in Table 6.

Table 9 indicates optical path differences (phase shift amounts) generated between adjacent annular zones in the outer area 12 of the objective lens 10 of the fourth example.

TABLE 9

| | OPD/λ | n | φ |
|---|---|---|---|
| C1–C2 | 2.75 | 3 | 5.50π |
| C2–C3 | 2.75 | 3 | 5.50π |
| C3–C4 | 2.86 | 3 | 5.72π |
| C4–C5 | 2.00 | | 4.00π |

As can be seen from Table 9, all of the optical path differences generated between adjacent annular zones in the outer area 12 except one generated between the annular zone C4 and the annular zone C5 satisfy the condition (1). Further, the optical path difference generated between the annular zone C3 and the annular zone C4 satisfies the condition (2). That is, all of the phase shift amounts generated between adjacent annular zones in the outer area 12 except one generated between the annular zone C4 and the annular zone C5 satisfy the condition (3). Further, the phase shift amount generated between the annular zone C3 and the annular zone C4 satisfies the condition (4).

Since all values of "n" shown in Table 9 except one between the annular zone C4 and the annular zone C5 are smaller than 6, the objective lens 10 of the fourth example satisfies the condition (5).

FIG. 6 is a graph illustrating the intensity distribution of the beam spot which the first beam (having relatively long wavelength) passed through the objective lens 10 of the fourth example forms on the data recording layer of the optical disc 20A (e.g., the CD). In FIG. 6, a vertical axis represents the intensity (unit: %) when the center intensity of the beam spot is considered as 100%, and a horizontal axis represents a radial position (unit:mm) from the center of the beam spot.

From the view point of the general distribution of the intensity of the beam spot shown in FIG. 6, the intensity decreases gradually, as the radial distance from the beam spot center increases. The intensity of the beam spot of the first beam at the radial position about 0.010 mm away from the beam spot center is substantially equal to zero. Accordingly, the objective lens 10 of the fourth example has advantages substantially equal to the above mentioned advantages of the first through third examples. This means that it is not necessary that all of the annular zones in the outer area 12 satisfy the conditions (1) through (4) so as to attain the same advantages as those of the first through third examples.

FIFTH EXAMPLE

A fifth example according to the embodiment of the invention will be described. Since a numerical configuration of an optical system of the fifth example is the same as that of the first example shown in Tables 1 and 2, the explanation thereof is not repeated.

Further, the configuration (i.e., the aspherical surface shape and the diffracting structure) of the front surface 10a of the objective lens 10 within the inner area 11 of the fifth example is the same as that of the first example shown in Tables 3 and 4, and the aspherical surface shape of the rear surface 10b of the objective lens 10 of the fifth example is the same as that of the first example. Therefore, detailed explanations of the inner area 11 of the front surface 10a of the objective lens 10 and the rear surface 10b of the objective lens 10 are not repeated.

In the fifth example, the objective lens 10 has four annular zones C1 through C4 on the front surface 10a within the outer area 12. As described above, the annular zones C1–C4 are formed as the parts of the respective aspherical surface. Table 10 shows the numerical structures of the four aspherical surfaces C1 through C4.

TABLE 10

| Annular Zone | C1 | C2 | C3 |
|---|---|---|---|
| H | $1.200 \leq h < 1.325$ | $1.325 \leq h < 1.427$ | $1.427 \leq h < 1.480$ |
| r | 1.56475 | 1.56678 | 1.56841 |
| K | −0.500 | −0.500 | −0.500 |
| A04 | $1.50838 \times 10-3$ | $1.51031 \times 10-3$ | $1.51185 \times 10-3$ |
| A06 | $-1.17294 \times 10-3$ | $-1.17621 \times 10-3$ | $-1.17883 \times 10-3$ |
| A08 | $6.01672 \times 10-4$ | $6.04954 \times 10-4$ | $6.07580 \times 10-4$ |
| A10 | $-4.47477 \times 10-4$ | $-4.44612 \times 10-4$ | $-4.42319 \times 10-4$ |
| A12 | $5.12115 \times 10-6$ | $5.25192 \times 10-6$ | $5.35654 \times 10-6$ |
| d_shift | −0.0139 | −0.01969 | −0.02432 |

| Annular Zone | C4 |
|---|---|
| H | $1.480 \leq h < 1.500$ |
| r | 1.56922 |
| K | −0.500 |
| A04 | $1.51262 \times 10-3$ |
| A06 | $-1.18014 \times 10-3$ |
| A08 | $6.08893 \times 10-4$ |
| A10 | $-4.41173 \times 10-4$ |
| A12 | $5.40885 \times 10-6$ |
| d_shift | −0.02664 |

In Table 10, "d_shift" has the same meanings as that shown in Table 6.

Table 11 indicates optical path differences generated (phase shift amounts) between adjacent annular zones in the outer area 12 of the objective lens 10 of the fifth example.

TABLE 11

| | OPD/λ | n | φ |
|---|---|---|---|
| C1–C2 | 4.79 | 5 | 9.58π |
| C2–C3 | 3.77 | 4 | 7.54π |
| C3–C4 | 1.92 | 2 | 3.83π |

As can be seen from Table 11, all of the optical path differences generated adjacent annular zones in the outer area 12 satisfy the conditions (1) and (2). That is, all of the phase shift amounts generated adjacent annular zones in the outer area 12 satisfy the conditions (3) and (4). Since all values of "n" shown in Table 11 are smaller than 6, the objective lens 10 of the fifth example satisfies the condition (6).

FIG. 7 is a graph illustrating the intensity distribution of the beam spot which the first beam (having relatively long wavelength) passed through the objective lens 10 of the fifth example forms on the data recording layer of the optical disc 20A (e.g., the CD). In FIG. 7, a vertical axis represents the intensity (unit: %) when the center intensity of the beam spot is considered as 100%, and a horizontal axis represents a radial position (unit:mm) from the center of the beam spot.

From the view point of the general distribution of the intensity of the beam spot shown in FIG. 7, the intensity decreases gradually, as the radial distance from the beam spot center increases. The intensity of the beam spot of the first beam at the radial position about 0.010 mm away from the beam spot center is substantially equal to zero. Accordingly, the objective lens 10 of the fifth example has advantages substantially equal to the above mentioned advantages of the first through fourth examples.

It is understood that the embodiment of the present invention is not limited to the above five concrete examples because, as described above, when at least one of the steps formed between the annular zones in the outer area 12 satisfies the condition (1), the objective lens 10 can attain advantages substantially equal to the above mentioned advantages of the first through fifth examples.

The present disclosure relates to the subject matter contained in Japanese Patent Application No. P2003-003535, filed on Jan. 9, 2003, which is expressly incorporated herein by reference in its entirety.

What is claimed is:

1. An objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc, wherein said objective lens has at least one surface on which a plurality of annular zones are formed, wherein said at least one surface is divided into an inner area and an outer area outside the inner area, said inner area having a necessary size for providing a first NA required by the first optical disc, and said outer area having a necessary size for providing a second NA required by the second optical disc and higher than said first NA, wherein, with regard to the light beam used for the second optical disc, an optical path difference generated between at least one of steps formed between adjacent annular zones of said plurality of annular zones within said outer area is lower by a predetermined amount than an integral multiple of the wavelength of the light beam used for the second optical disc, wherein the optical path difference satisfies a condition:

$$(n-0.4) \leq OPD/\lambda < n \quad (1)$$

where OPD is the optical oath difference, λ represents the wavelength of the light beam used for the second optical disc, and n represents a natural number.

2. The objective lens according to claim 1, wherein the optical path difference OPD further satisfies a condition:

$$(n-0.25) \leq OPD/\lambda \leq (n-0.05) \quad (2).$$

3. The objective lens according to claim 1, wherein the steps between adjacent annular zones of said plurality of annular zones are formed such that, at each step, an outside annular zone of a step protrudes with respect to an inside annular zone of the step.

4. The objective lens according to claim 1, wherein the natural number n satisfies a condition:

$$1 \leq n \leq 6 \quad (5).$$

5. An objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc, wherein said objective lens has at least one surface on which a plurality of phase shift surfaces are formed as a plurality of annular zones, wherein said at least one surface is divided into an inner area and an outer area outside the inner area, said inner area having a necessary size for providing a first NA required by the first optical disc, and said outer area having a necessary size for providing a second NA required by the second optical disc and higher than said first NA, wherein, with regard to the light beam used for the second optical disc, a phase shift amount generated by at least a pair of adjacent annular zones within said outer area is lower by a predetermined amount than an integral multiple of $2\pi$, wherein the phase shift amount satisfies a condition:

$$2(n-0.4)\pi \leq \phi < 2n\pi \qquad (3)$$

where $\phi$ is the phase shift amount, and n represents a natural number.

6. The objective lens according to claim 5, wherein the phase shift amount $\phi$ further satisfies a condition:

$$2(n-0.25)\pi \leq \phi \leq 2(n-0.05)\pi \qquad (4).$$

7. The objective lens according to claim 5, wherein steps are formed between adjacent annular zones of said plurality of annular zones such that, at each step, an outside annular zone of a step protrudes with respect to an inside annular zone of the step.

8. The objective lens according to claim 5, wherein the natural number n satisfies a condition:

$$1 \leq n \leq 6 \qquad (5).$$

9. An objective lens for an optical pick-up used for converging at least two light beams having different wavelengths on data recording surfaces of at least two optical discs having different recording densities, respectively, a wavelength of a light beam used for a first optical disc is longer than a wavelength of a light beam used for a second optical disc whose recording density is higher than that of the first optical disc, wherein said objective lens has at least one surface on which a diffracting structure is formed as a plurality of annular zones, wherein said at least one surface is divided into an inner area and an outer area outside the inner area, said inner area having a necessary size for providing a first NA required by the first optical disc, and said outer area having a necessary size for providing a second NA required by the second optical disc and higher than said first NA, wherein a blazed wavelength in said outer area is lower by a predetermined amount than an integral multiple of the wavelength of the light beam used for the second optical disc, wherein the blazed wavelength satisfies a condition:

$$0.9 \leq \lambda_0/m\lambda < 1.0 \qquad (6)$$

where $\lambda_0$ is the blazed wavelength, $\lambda$ represents the wavelength of the light beam used for the second optical disc, and m represents a diffraction order of the light beam used for the second optical disc diffracted by the diffracting structure within said outer area.

10. The objective lens according to claim 9, wherein said diffraction structure has positive refractive power.

* * * * *